United States Patent [19]

Peterson et al.

[11] Patent Number: 5,683,157

[45] Date of Patent: Nov. 4, 1997

[54] PORTABLE KITCHEN AND SYSTEM FOR STORING AND PREPARING FOOD

[75] Inventors: Kent N. Peterson, Fall Creek; Nathan L. Norgaard, Eau Claire; Terry D. Grabow, Prescott, all of Wis.; Michael A. Willier, St. Paul, Mass.

[73] Assignee: Newman Lee Company, L.L.C., Fall Creek, Wis.

[21] Appl. No.: 438,060

[22] Filed: May 8, 1995

[51] Int. Cl.$^6$ .............. A47B 77/06; A47K 1/04; E03C 1/18
[52] U.S. Cl. .............. 312/228; 312/229; 312/100; 312/140.2; 312/293.3; 312/293.1; 312/237; 312/241; 4/638
[58] Field of Search .............. 312/228, 229, 312/100, 109, 140.1, 140.2, 140.3, 293.1, 293.2, 293.3, 244, 237, 241; 4/619, 630, 638, 643, 644, 647, 648, 649, 654

[56] References Cited

U.S. PATENT DOCUMENTS

| 29,493 | 8/1860 | Iske | 312/228 X |
| 1,082,082 | 12/1913 | Jiranek | 312/228 X |
| 1,798,183 | 3/1931 | Yoshardt | 4/630 |
| 3,082,050 | 3/1963 | Baxter et al. | 312/228 X |
| 3,251,637 | 5/1966 | Parsons, Jr. | 312/228 X |
| 4,747,169 | 5/1988 | Valbuena | 4/638 X |
| 5,156,450 | 10/1992 | Lee | 312/229 X |
| 5,281,016 | 1/1994 | Brague | 312/140.2 |
| 5,349,708 | 9/1994 | Lee | 4/638 |

FOREIGN PATENT DOCUMENTS

| 731039 | 3/1966 | Canada | 312/228 |
| 604150 | 9/1934 | Germany | 312/228 |
| 2834176 | 5/1979 | Germany | 4/638 |
| 7902204 | 9/1980 | Netherlands | 312/228 |
| 1118343 | 10/1984 | U.S.S.R. | 312/228 |
| 249664 | 4/1926 | United Kingdom | 312/228 |

Primary Examiner—Peter M. Cuomo
Assistant Examiner—Rodney B. White
Attorney, Agent, or Firm—Anthony J. Bourget

[57] ABSTRACT

A portable kitchen for storing and preparing food products comprising a main box having a table, a sink detachably connected to and covering the main box, and a front panel pivotally attached to the main box where the front panel opens to provide access to a compartment defined by the main box.

3 Claims, 13 Drawing Sheets

PORTABLE KITCHEN AND SYSTEM FOR STORING AND PREPARING FOOD

BACKGROUND OF THE INVENTION

1. Field of the Invention

The present invention generally relates to portable camping equipment and more particularly to a portable kitchen having many useful features including a detachable sink. The invention may be referred to as a portable kitchen and can be used when camping, for general travel, or when a quick set-up of a kitchen is necessary.

2. Related Background Art

When camping, tailgating, or otherwise traveling away from home it is desirable to bring food and equipment for preparing meals. The ease or freedom of camping or travel from home can be defeated when one is required to carry along a variety of utensils and food products. Often a camper brings along a stove, plates, cups, knives, forks, utensils, napkins, and a variety of foods, food condiments and containers. Typically these items are carried separately or grouped together in a variety of bags, containers, or boxes. The food items and equipment are then combined with other camping or travel equipment such as boots, clothes, sporting goods, fishing tackle, coolers, chairs, blankets, tents, maps, buckets or whatever. A variety of food items combined with a variety of other equipment can become numerous and burdensome for transport and organization. Accordingly, there exists a need for encompassing food items in one self-contained carrier or transporter. Having all or several food related products combined would allow a camper to organize and conveniently assemble his or her trip, without the hassle of carrying items separately. If the camper wanted to make a quick meal, he or she could quickly locate the relevant materials. When collecting items to take for camping, the camper would be able to stock the items in one place, thus facilitating the speed of packing and also providing an additional opportunity to confirm that all necessary items are present.

In addition to centralizing all food related items, it is desirable to minimize the amount of equipment needed for camping or for taking along on a trip. Having equipment that accomplishes multiple camping purposes would eliminate the need for bringing surplus supplies. Moreover, camping equipment occupies space in a camper's automobile, recreational vehicle, boat or other vehicle. Therefore, it is desired to have equipment that has multiple purposes, eliminating the need for extra items or allowing a camper to have additional items or resources at his or her disposal. Preferably the equipment would be light-weight and easily carried.

Moreover, when camping or traveling it is often desirable to have a sink or wash basin. A sink can be used to wash dishes or clothes or to carry water or a variety of items. A light-weight sink offering great depth/volume is an attractive feature to campers. Due to space limitations or other reasons it is not always possible to bring along an additional item such as a sink or wash basin. Campers can appreciate the utility of having a sink, especially if having the sink requires little or no additional effort or occupies little or no additional space.

Another item attractive to campers is use of a clean and sturdy working space. In the absence of a picnic table, a camper often seeks to find an alternative. An elevated stand or sturdy support allows the camper to conveniently operate his or her stove, or to otherwise prepare a meal. Rather than placing items on the ground, campers seek convenient surfaces or tables. Campers prefer to have the utility of such surfaces, especially if providing the surfaces require little or no additional effort or occupies little or no additional space. The background features identified above are attractive to people camping, as well as picnicking, tailgating, military camping, disaster camping, roadtripping or other event involving use of food transportation and preparation.

Various devices have been suggested for use by campers or travelers to make camping, traveling, and preparing meals easier. Applicants have found no commercially acceptable or useable camping devices which incorporate the concepts of their invention. While there are background patents related to outdoor or portable kitchens, applicants have found no patents which illustrate or describe the aspects of the present invention, nor do they include the advantages of the present invention.

U.S. Pat. No. 5,110,193, relates to a portable travel pantry for carrying food items and items relating to serving of food. The patent discloses use of a catch-all module means for receiving relatively bulky food items, and use of a main module means having a swingable front wall. The front swingable wall is overlapped by a swingable top wall having an overhanging skirt-like structure. According to the specification, the front swingable wall is joined by hinges to a main floor portion of the main module, and the front end portion of the front swingable wall may overlap beyond the edge of a table top surface. Also according to the specification, the catch-all module forms a rectangular enclosure for receiving and transporting substantially more bulky items, garbage, or other miscellaneous items such as might be placed in paper bags. The catch-all module is retained in removable hook-like fashion by use of overlapping side flanges and is lifted free from the main module by use of handles. This type of travel pantry does not provide for a detachable sink as described in applicant's invention. The travel pantry also does not provide a table top, nor does it provide a front panel that only opens to a relatively horizontal position.

U.S. Pat. No. 3,915,529 relates to a compact field kitchen including a sink, a stove and storage areas. The field kitchen has windbreaker wings and worktable wings, and the kitchen components can be folded into a carrying case for transport. This kitchen, likewise, does not provide for a detachable sink as described in applicant's invention. Moreover, this type of kitchen does not provide a fixed table top, nor does it provide a front panel that operates like the front panel of applicants' invention.

U.S. Pat. No. 3,811,559 relates to a picnic apparatus having stackable containers adapted for specific storage or utilitarian function. A first container includes a cooking grill. The apparatus also discloses use of a container having a bottom, side walls and top wall including a water fill hole; and container units having an indentation in the outer liners of opposite side walls to form hand grip openings. This patent also does not disclose use of a detachable sink as described in applicant's invention. Moreover, this patent does not disclose a table top as shown in applicants' invention, nor does it disclose an interlocking front panel.

U.S. Pat. No. 2,594,938 relates to a portable camping sink having a first casing forming a tank with an outlet means and being supported perpendicular to a second casing. The second casing has a detachable receptacle seated in an opening in the second casing. Water in the first casing flows through the outlet into the receptacle. This patent also does not disclose any of the features of applicants' invention.

None of the above cited references, including reference patents U.S. Pat. Nos. 2,944,862; Des. 285,522; 3,472,219;

4,696,282; 4,092,973; 4,848,312; or 5,349,708 disclose a portable kitchen that features the combined advantages of applicants' invention.

SUMMARY OF THE INVENTION

The present invention comprises a novel portable kitchen for storing food products and food service items. In addition to facilitating storage and transport of food, the kitchen is designed so that food may be conveniently prepared or displayed. The kitchen is made of light-weight, rugged plastic and is easily carried. One embodiment of the invention relates to a portable kitchen which includes a main box and a sink that is detachably connected to the main box. The portable kitchen has a variety of features. Particularly, the portable kitchen includes a sink that operates as a lid to cover the main box. The sink is attached to the main box by a hinge so that it may be lifted to reveal items stored on a table integrally connected to the main box. Items such as a stove, a loaf of bread, buns or chips are conveniently stored on the table and in the space under the sink/lid. The table includes a lip and railing to prevent items from rolling off the table. A front panel is pivotally attached to the main box and opens to provide access to a compartment within the main box. Multiple compartments may be provided to accommodate for various shapes and sizes of items used for camping. The front panel flips down and is secured at a relatively horizonal or right angle. This allows for an additional work space for the camper. The front panel contains a brim to prevent items from rolling or sliding off the panel and it also provides for a secure and flush contact with the main box. The detachable sink allows a camper to wash clothes or dishes. The sink also allows the kitchen to be elevated by standing the main box on top of the sink. Moreover, when the sink is closed it interlocks with the front panel to secure items within the kitchen. The sink is constructed of plastic so that it is waterproof, lightweight and durable. Handles are conveniently located on opposite sides and are constructed for comfortable, secure carrying.

A further embodiment of the invention relates to a portable kitchen comprising a main box having a table, a sink detachably and hingedly connected to the main box, and a front panel pivotally attached to the main box and opening to provide access to a compartment defined by the main box.

Yet a further embodiment of the invention relates to a system of storing and preparing food products including the steps of providing a main box having a table, providing a sink defining an area for storing liquid and items, and providing a front panel; detachably and hingedly connecting the sink to the main box; and rotatably connecting the front panel to the main box; wherein a camper places food products in the main box while preparing foods on the table or on the front panel.

One object of the present invention is to provide a novel product which is useful for campers and travelers and to provide them with a handy carrying case which includes a sink.

Another object of the present invention is to provide a novel product that is useful for carrying and preparing food products.

Another object of the present invention is to provide a novel product that has a lid which protects the contents of the carrying case and which is also detachable and used for other purposes.

Yet another object of the present invention is to provide a portable kitchen that supports the use of an outdoor stove, as well as allows a camper to carry along additional food products and utensils in one system.

Still another object of the invention is to provide a light-weight, inexpensively manufactured product that is durable.

Another object of the invention is to provide a portable kitchen that has a water-proof sink.

Another object of the invention is to provide a portable kitchen that facilitates housing the most essential items used for preparing meals while camping or traveling.

A further object of the present invention is to provide a system for transporting and storing food and food service items.

The above as well as other objects of the present invention will become apparent when reading the accompanying descriptions and drawings.

DETAILED DESCRIPTION OF THE PREFERRED EMBODIMENTS

Referring now to all the drawings there is shown a portable kitchen 10. Kitchen 10 is designed to carry food items and food service utensils, as well as provide utility for food preparation and display. Food products include food and utensils used for preparing or serving food.

Figure 1:
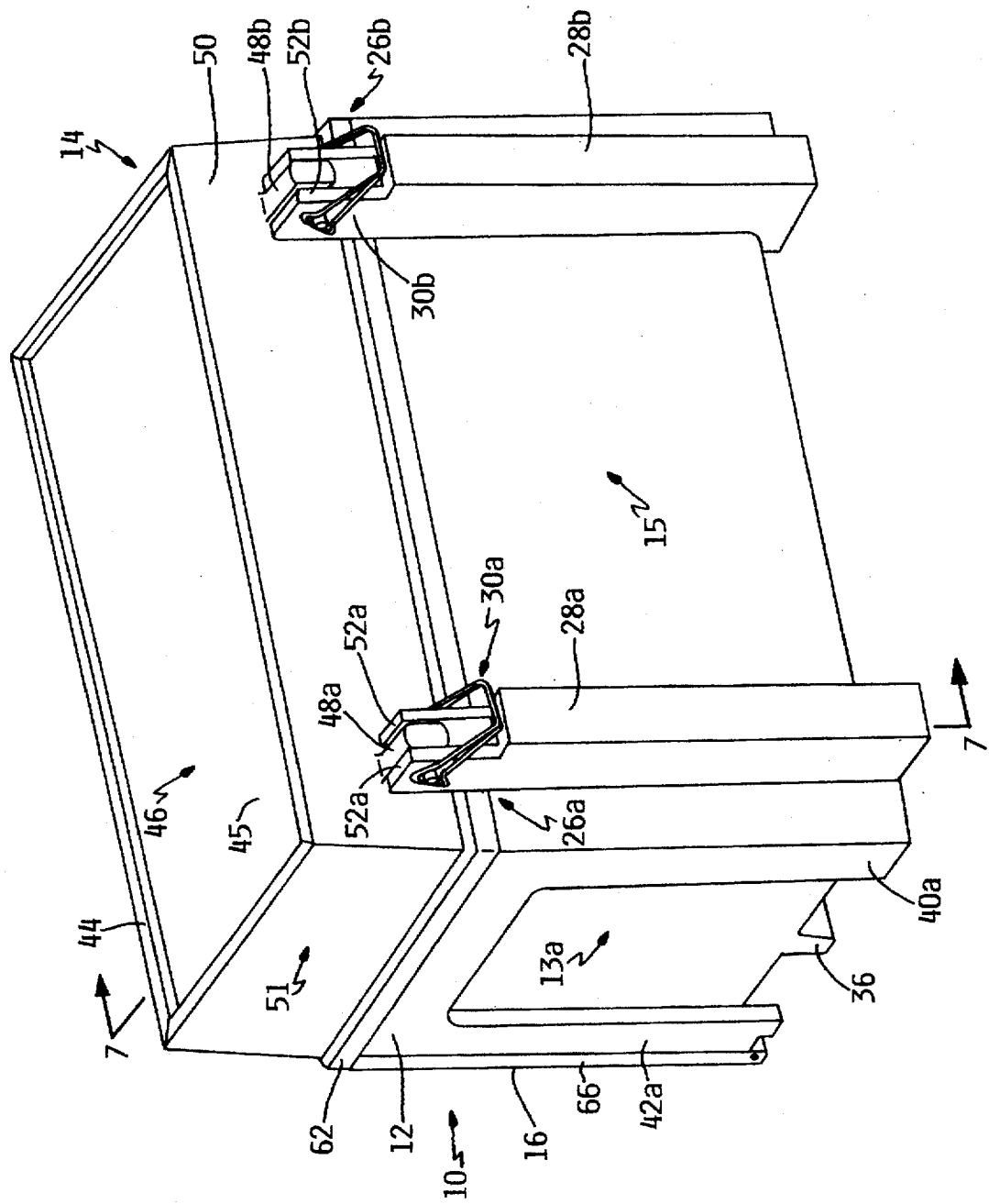
FIG. 1 is a rear perspective view of the portable kitchen illustrated in its closed position where the sink closes over the main box and interlocks the front panel.
Figure 2:
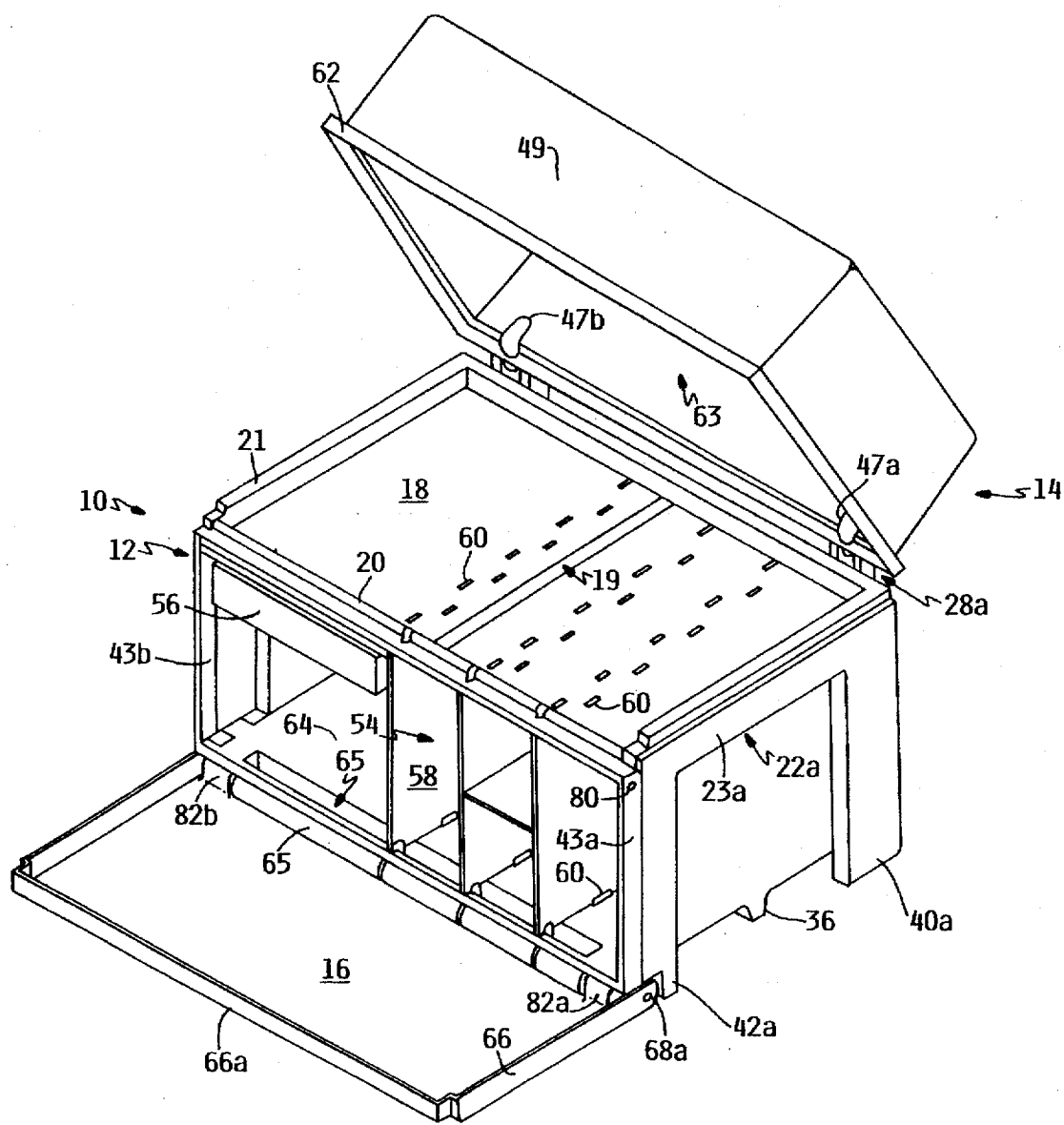
FIG. 2 is a front perspective view of the portable kitchen illustrating a fully opened front panel and a partially opened sink.
Figure 3:
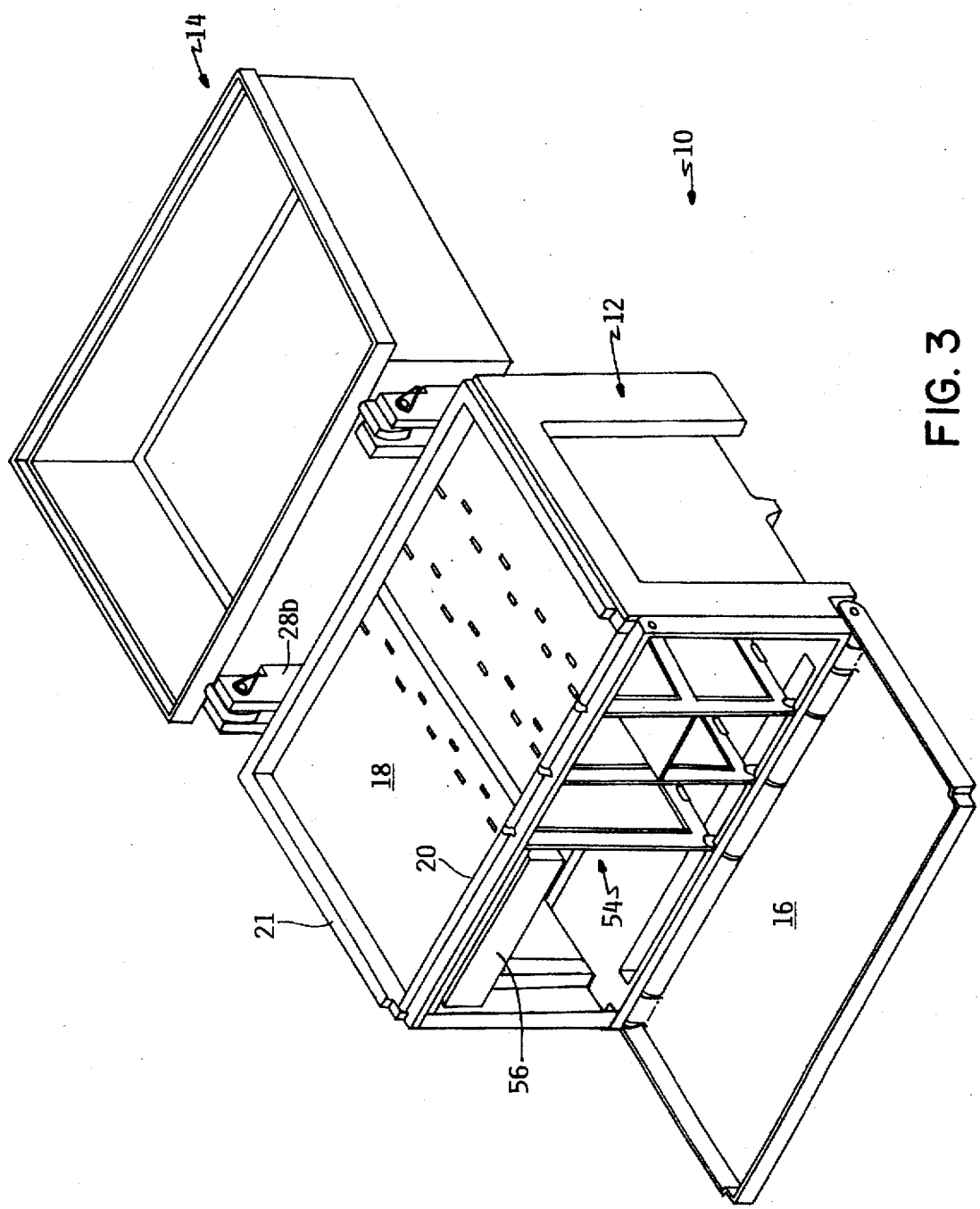
FIG. 3 is a front perspective view of the portable kitchen illustrating a fully opened front panel and a fully opened and attached sink.

FIGS. 1 through 3 demonstrate the opening of portable kitchen 10, and FIGS. 5, 11, 12 and 13 demonstrate kitchen 10 having sink 14 detached. Sink 14 has many uses and important features when it is attached to kitchen 10, including operation as a lid to cover the main box 12, as a lock to interlock or overlock front panel 16, and as a wash basin or item receptacle. Sink 14 is waterproof. When sink 14 is detached from kitchen 10 it may be used for a variety of purposes, including a stand, a table, a storage bin, or a wash basin.

Figure 6:
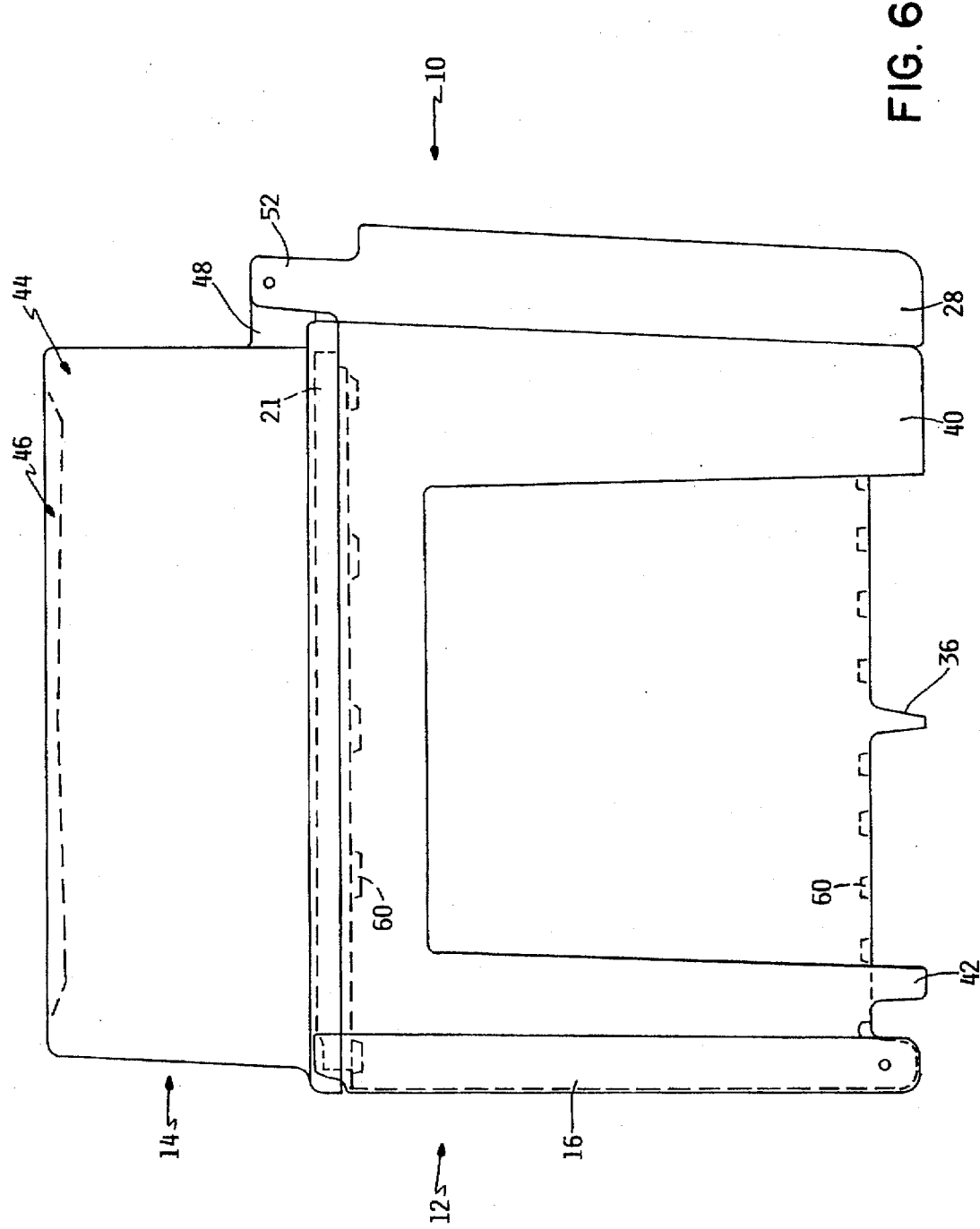
FIG. 6 is a right side view of the portable kitchen illustrated in its closed position.

Sink 14 preferably has sink perimeter 44 and recess area 46 as illustrated in FIGS. 1 and 6. Sink perimeter 44 and recess area 46 allow for items to be set upon sink 14 and contain spills or prevent items from rolling or sliding off kitchen 10. Sink front panel 49, sink rear panel 50, sink side panels 51, sink top 45 and sink perimeter 44 combine to create a basin in which water may be retained. As shown in FIG. 1, sink top 45 is continuous. Sink top 45 has no uncovered holes, cracks, or apertures. In closed position as shown in FIG. 1, sink 14 acts as a lid to house contents placed on table 18. In closed position as shown in FIG. 1, recess area 46 contains spills and hold items.

Figure 11:
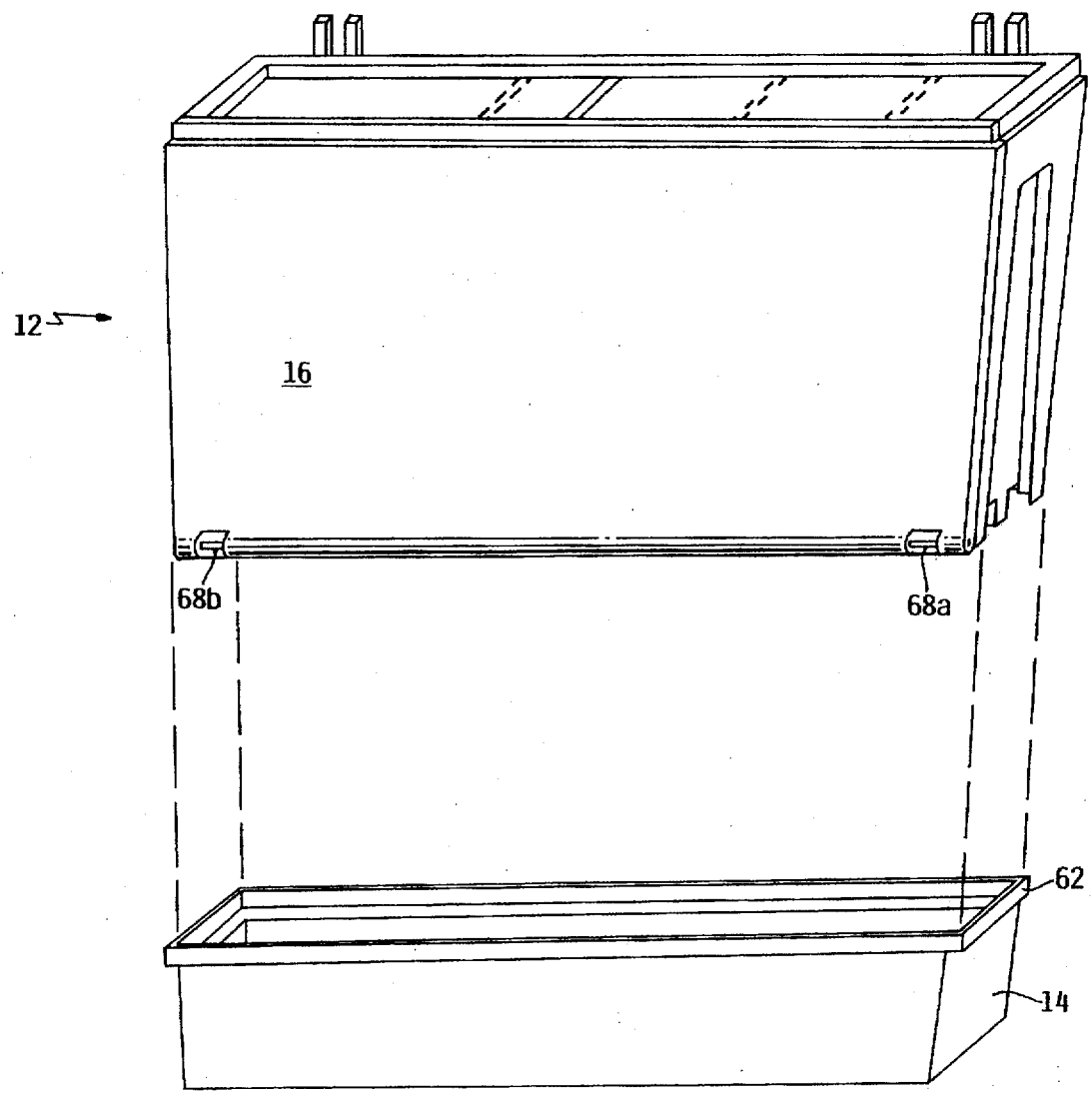
FIG. 11 is a perspective view illustrating the main box being set upon the detached and inverted sink.
Figure 12:
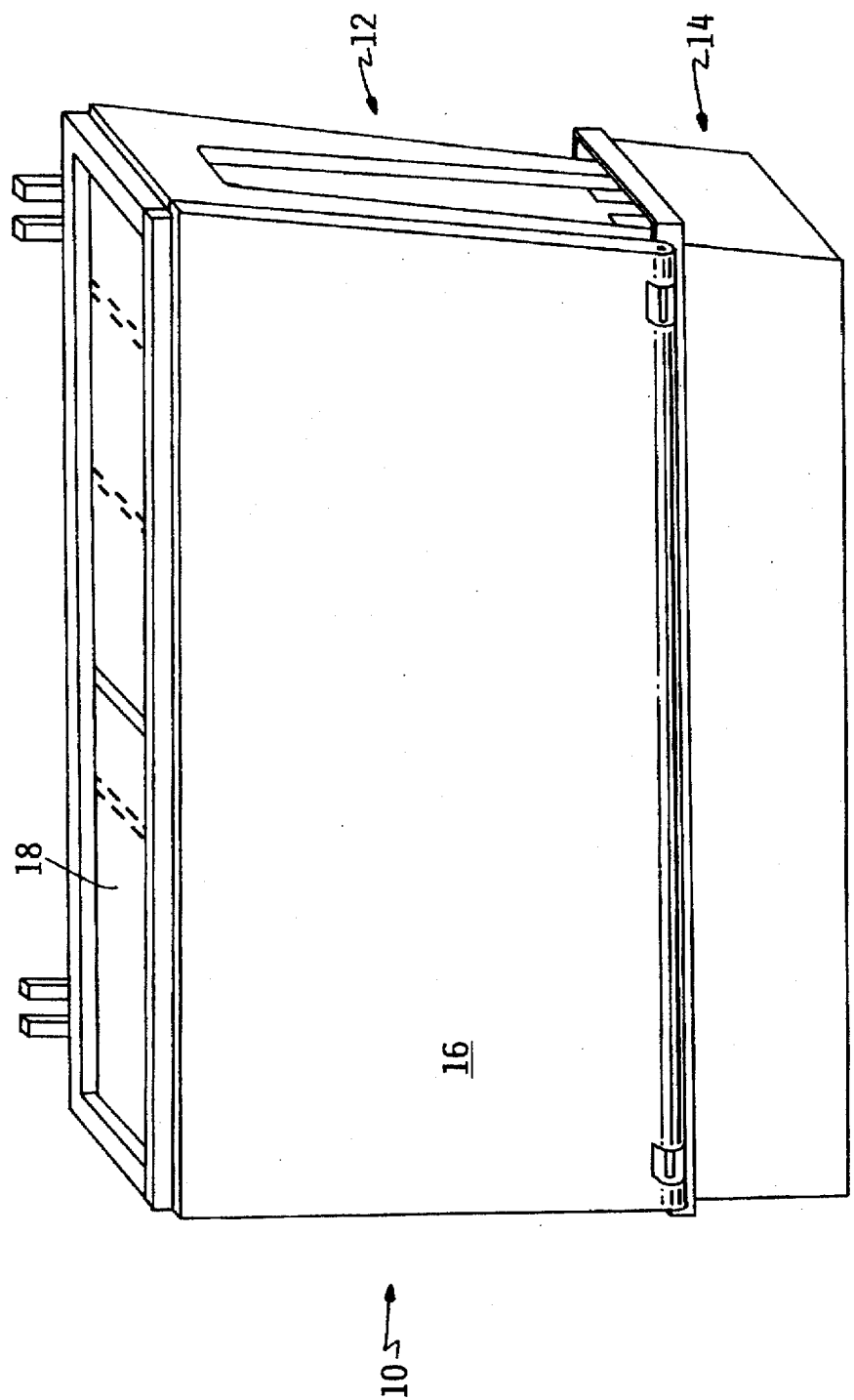
FIG. 12 is a perspective view illustrating the detached sink being used as a stand to support the main box.
Figure 13:
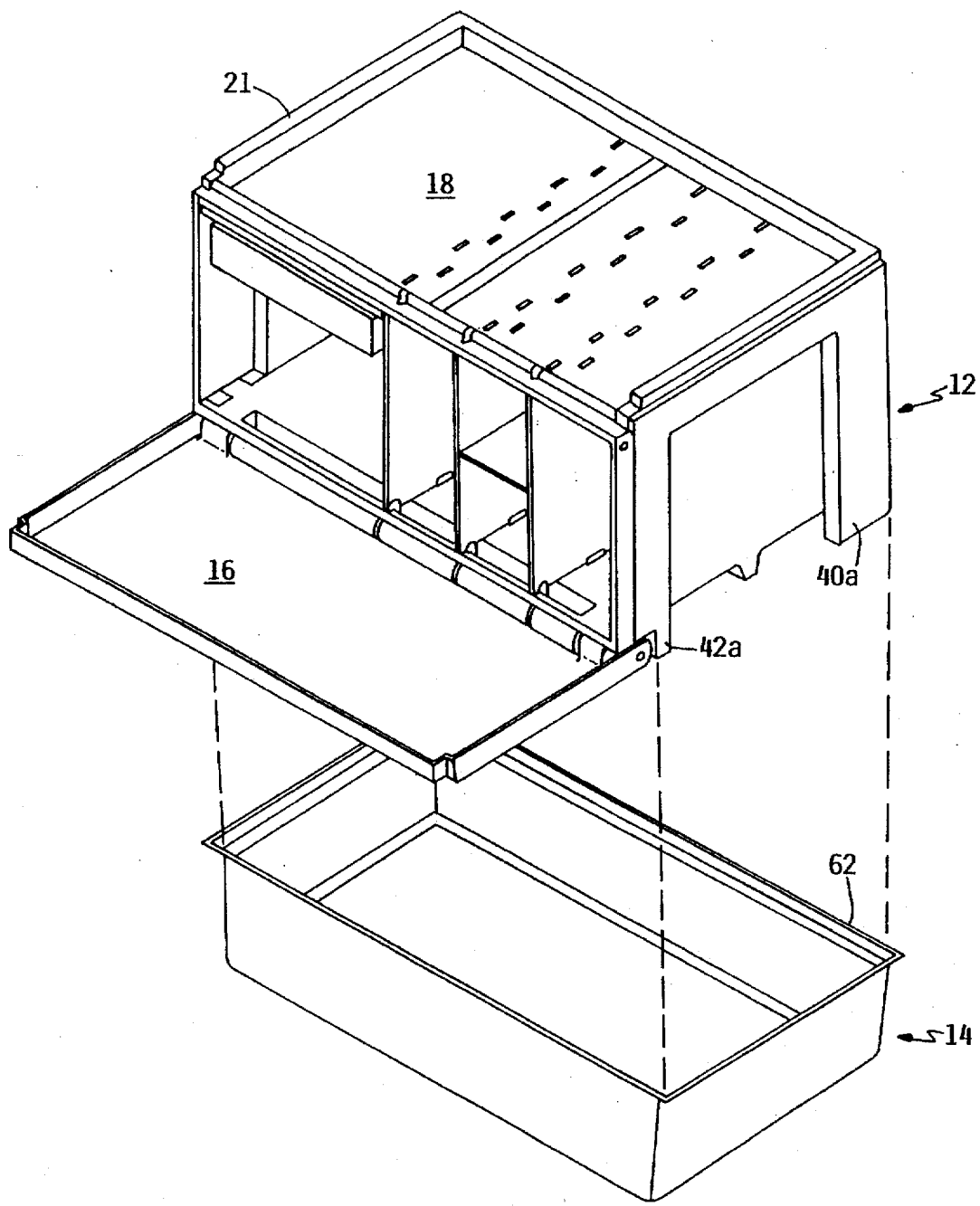
FIG. 13 is a perspective view illustrating the sink being used as a stand to support the main box where the front panel is open.
Figure 14:
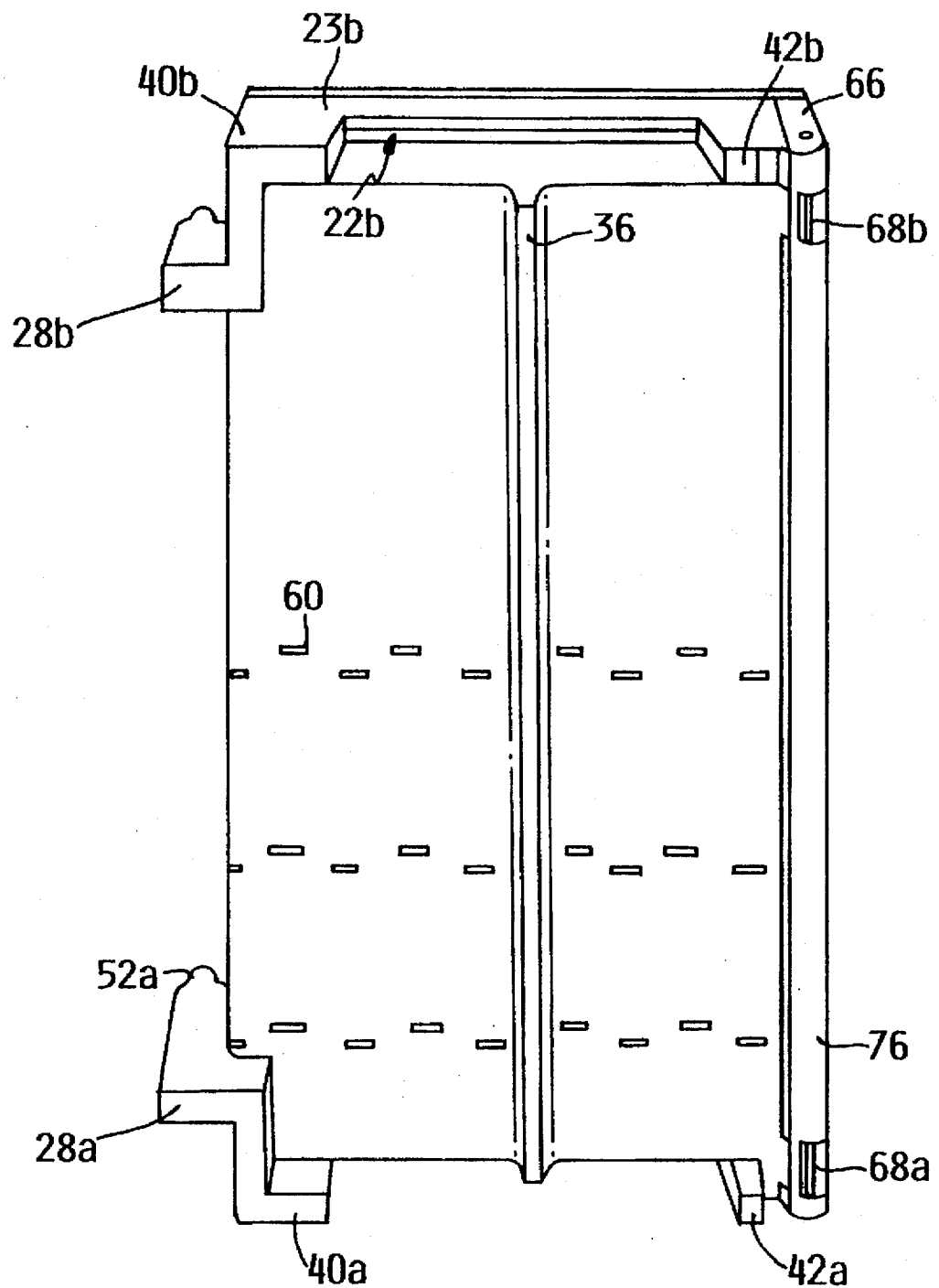
FIG. 14 is a rear view illustrating the kitchen with front panel closed and sink closed.

Sink brim 62 is integrally connected to sink 14 and circumscribes sink opening 63 as shown in FIG. 2. When sink 14 is closed, brim 62 aligns flush with, and covers main box 12. Sink 14 is detachable from main box 12 as further described herein. When sink 14 is detached it may be inverted (opening 63 directed upward) and used as a stand as shown in FIGS. 11, 12 and 13. Brim 62 operates as a platform to receive main box 12. Main box 12 sits upon sink 14 by resting on brim 62. As shown in FIGS. 12 and 14, rear support legs 40a and 40b, front support legs 42a and 42b, and hinge beams 28a and 28b rest upon brim 62. While in this position, front panel 16 may either be opened as shown in FIG. 13 or closed as shown in FIGS. 11 and 12.

Figure 5:
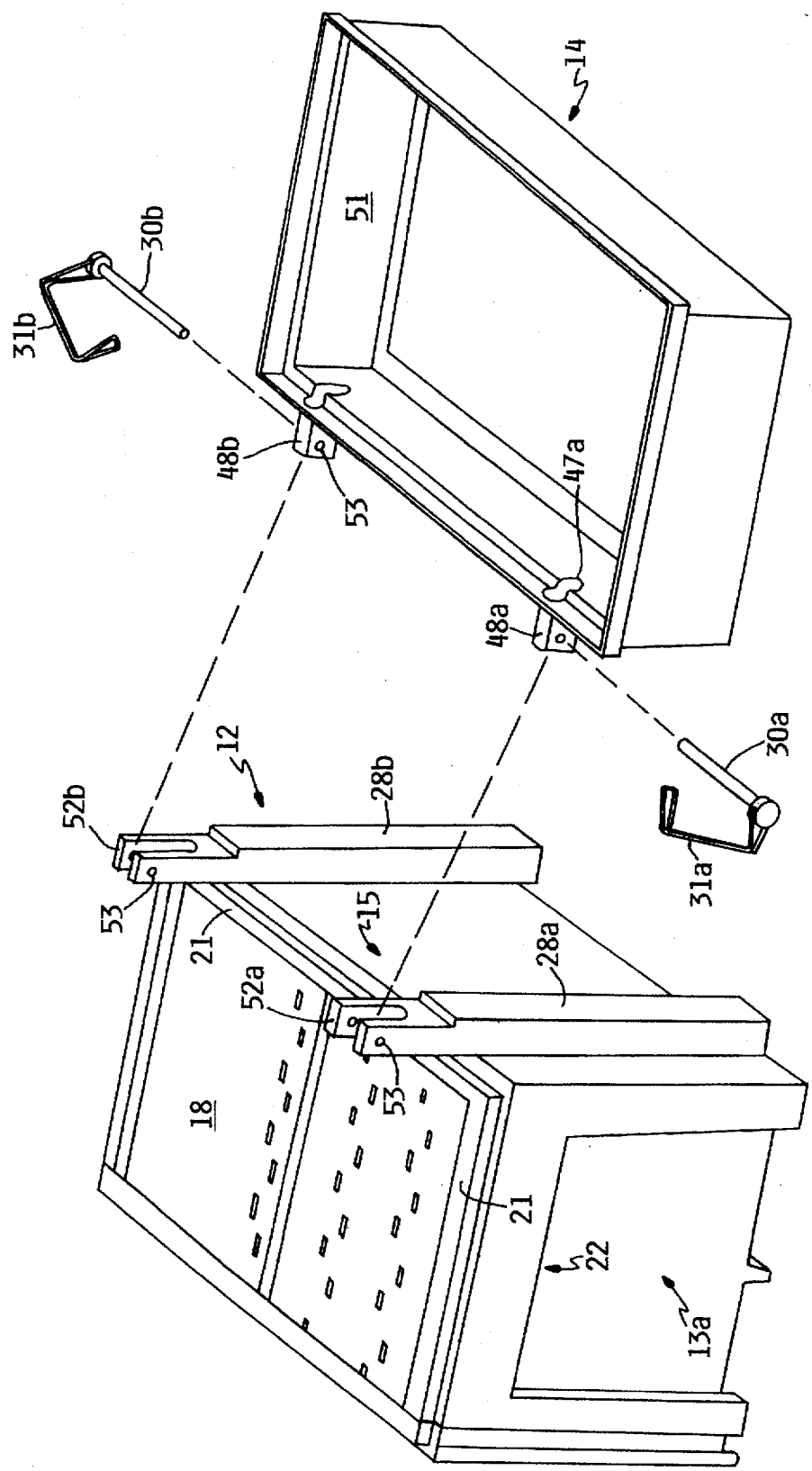
FIG. 5 is an exploded view showing the sink disconnected from the main box.

Sink 14 also has arms 48a and 48b which extend from rear sink panel 50 as shown in FIG. 1. Arms 48 are integrally connected to sink 14 and protrude outward, leaving hollows 47a and 47b as shown in FIG. 2. As shown in FIGS. 1 and 5, arms 48a and 48b meet with hinge beams 28a and 28b, respectively. Hinge beams 28a and 28b are integrally connected to main box 12 at box rear 15 as shown in FIGS. 1 and 5. As shown in FIG. 5, sink 14 detachably connects to main box 12. Sink 14 detachably connects at box rear 15. More particularly, sink 14 connects to at least one hinge beam 28 which is integrally connected to box rear 15. Prongs 52a and 52b are integrally connected to box rear 15 and extend a distance above main box 12 as shown in FIGS. 1, 3, 5, 6, 11, and 12. Arms 48a and 48b sandwich between prongs 52a and 52b, respectively. As shown in FIG. 6, arm 48 extends from sink 14 a distance sufficient to connect to prong 52 while enabling sink 14 to rotate upward to clear railing 21. Arms 48 and prongs 52 all have apertures 53 through which pins 30a and 30b slide and fasten. Pins 30 may be bolts or other fasteners and preferably have loops 31a and 31b. Loops 31 are connected to one end of pins 30 and loop or fasten around to the other end of pins 30. This assures that pins 30 stay in place while providing easy fastening and unfastening when desired.

Sink 14 is connected to kitchen 10 by placing arms 48 in aligned position between prongs 52 and sliding pins 30 through the aligned apertures to thereby connect the sink to main box 12 as demonstrated in FIGS. 1 and 5. FIG. 5 illustrates main box 12 and sink 14 when detached from each other. When detached, sink 14 can be carried away and used for many purposes, including as a basin for washing dishes or clothes, as a receptacle for carrying water or items, or any other purpose requiring a sturdy, container type structure. Sink 14 can also be used as a stand as shown in FIGS. 11, 12 and 13, or as a table of its own.

The combined structure of arms 48, prongs 52, and pins 30 create hinges 26a and 26b. Sink 14 is detached from main box 12 by removing pins 30 from hinges 26. It may be appreciated that sink 14 may be attached to main box 12 in a variety of ways, including use of a continuous hinge or having double arms extending from sink panel 50, but applicants have found use of the hinge-type arrangement indicated above to be preferable.

Figure 7:
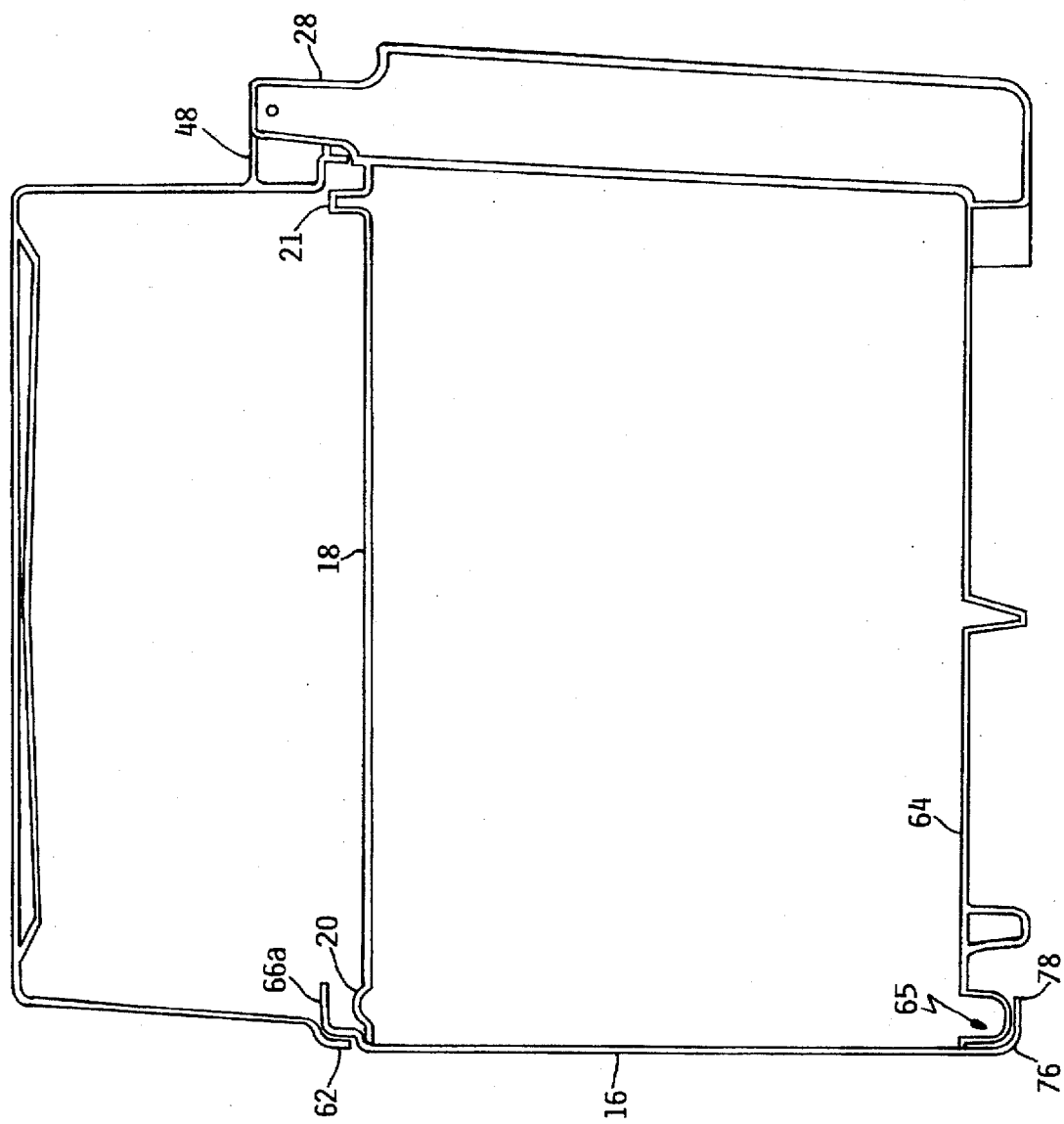
FIG. 7 is a cross sectional view of the portable kitchen taken along lines 7—7 of FIG. 1.

Main box 12 contains a table 18 upon which a variety of items may be placed, including a stove, utensils and food products. Table 18 preferable contains a support groove 19 which runs along a center position from the front to the rear of table 18. Groove 19 provides added structural support and stability. Table 18 also contains lip 20 which acts as a barrier and inhibits items from falling, sliding, or rolling off table 18. Lip 20 may be of many shapes and sizes but is preferably rounded and located at a front top edge of main box 12. Table 18 is positioned at the top portion of main box 12 as shown in FIG. 2, however it may be manufactured to be positioned at a lower position or perhaps manufactured for variability. Preferably, table 18 is molded in the position shown in FIG. 2. As shown in FIG. 7, table 18 is positioned opposite box bottom 64.

Railing 21 is integrally connected to main box 12 and defines a railing running along the rear and side edges of table 18 in a "U" shaped manner as shown in FIG. 2. Lip 20 runs along the front top edge of main box 12. Railing 21 acts as a barrier to inhibit items from falling, sliding, or rolling off table 18. Railing 21 also provides structural support and matingly receives brim 62 of sink 14.

Main box 12 has side portions 13a (and 13b, not shown) as shown in FIGS. 1 and 5. Main box 12 also contains compartments 54 which can be of varying shapes and sizes. Preferably, main box 12 has compartments 54 which accommodate storage of commonly used camping utensils such as cups, plates, cans and silverware. Tray 56 is designed to house silverware and other camping tools and preferably suspends beneath table 18 and slides out when pulled. Tray 56 is configured to conveniently receive spoons, forks, knives and the like. Multiple compartment panels 58 are used to separate the various compartments 54. Panels 58 may be arranged in many variations, but applicants have found the arrangement shown in FIG. 2 to be preferred. Such arrangement maximizes use of the storage space provided and provides compartments of common or useful dimensions. A multiplicity of blocks 60 are provided as guides for the insertion and rearrangement of panels 58. Panels 58 slide into position and rest between alternating blocks 60. Blocks 60 are integrally molded into table 18 and into box bottom 64.

Main box 12 also has left and right side panels 23a and 23b defining recessed handles 22a and 22b. Handle 22b can be seen best in FIG. 14. Handles 22a and 22b define gaps which allow a camper to position their hands so that the kitchen 10 may be lifted and transported. The gaps defined by handles 22 are preferably at least one-half inch wide so that a camper's fingers can securely grasp the handles 22. Handles 22 run from front support legs 42 to rear support legs 40 and also operate to give further support to main box 12.

Main box 12 is substantially rectangular and has a pair of integrally connected front support legs 42a and 42b located at opposite ends on the two front corners of main box 12. Rear support legs 40a and 40b are integrally connected to main box 12 at opposite ends on the two rear corners of main box 12. Trim panels 43a and 43b are integrally connected to front support legs 42 and run from the bottom to the top of main box 12.

Stabilizing beam 36 is integrally connected to main box 12 and runs along box bottom 64 as shown in FIG. 14. Stabilizing beam 36 extends down from box bottom 64 toward the level ground. Beam 36 provides added strength to kitchen 10 as well as stabilization. Beam 36 is designed to be shorter than support legs 40 and 42, which contact the level ground (not shown). By designing beam 36 to be shorter than legs 40 and 42, kitchen 10 is less likely to rock or spin due to contacting the ground at a middle position or along beam 36. Moreover, beam 36 is preferably concave, or tapered to its midpoint, which further reduces the likelihood that kitchen 10 will rock or spin. Rear support legs 40a and 40b, front support legs 42a and 42b, and hinge beams 28a and 28b contact with the level ground. If the ground is not level, stabilizing beam 36 may make additional contact with the ground to provide stabilization. Rear support legs 40 and front support legs 42 extend a distance below box bottom 64. Stabilizing beam 36 extends below box bottom 36 less than the distance which rear support legs 40 and front support legs 42 extend.

Figure 4:
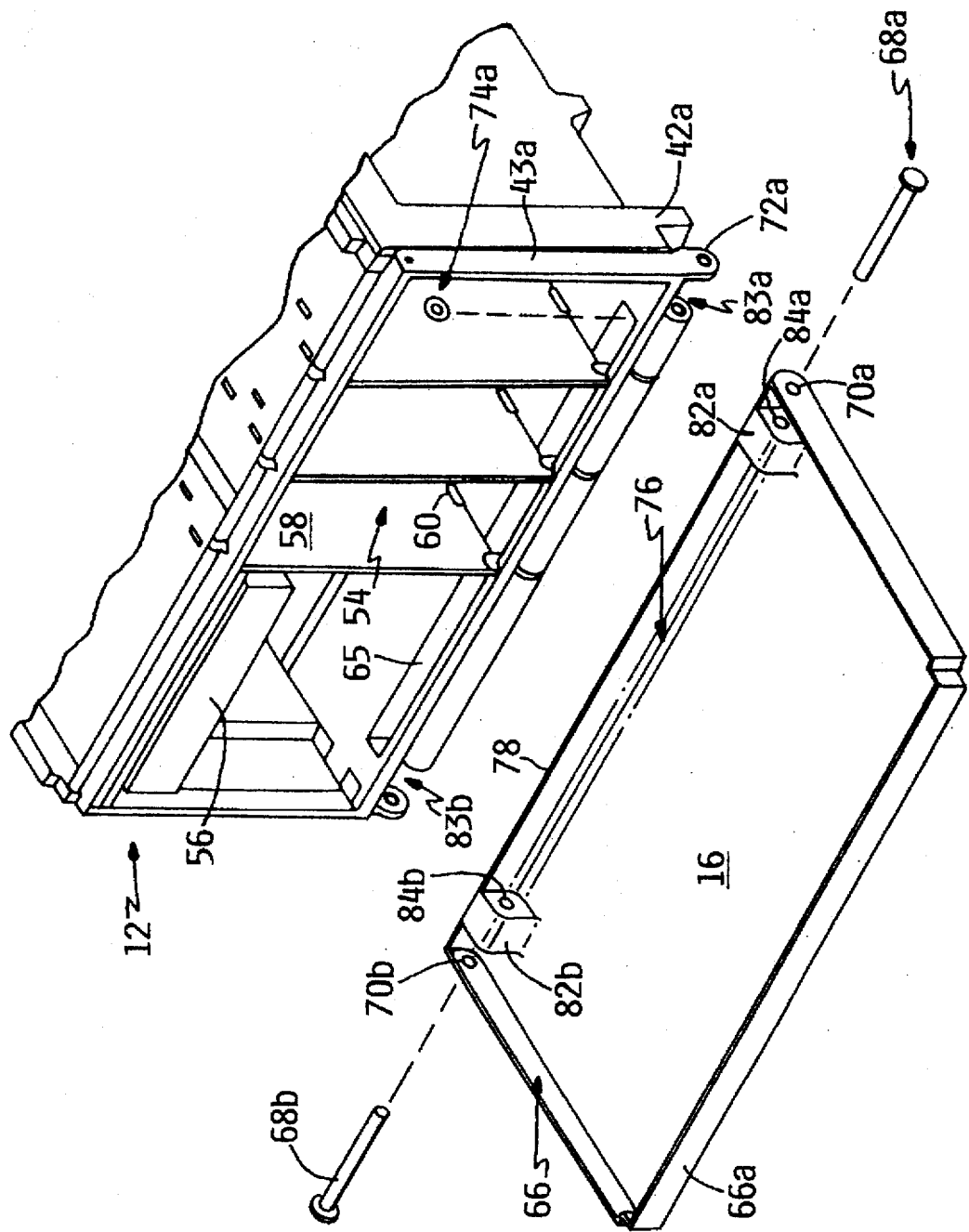
FIG. 4 is an exploded view showing the front panel disconnected from the main box.

Front panel 16 is pivotally attached to kitchen 10 at the bottom of trim panels 43a and 43b. As shown in FIGS. 1, 6, 7, 9, 10, 11, and 12, front panel 16 is exposed when sink 14 is closed. Front panel 16 defines holes 70a and 70b through which front bolts 68a and 68b insert, as shown in FIG. 4. FIG. 4 illustrates main box 12 before front panel 16 is attached. Panels stumps 82a and 82b are integrally connected to front panel 16 and stumps 82a and 82b are positioned into stump gaps 83a and 83b, respectively. Panel stumps 82 have hollowed backs so that bolts 68 are exposed when inserted into stumps 82 as shown in FIGS. 11 and 14. Panel stumps 82 define stump holes 84a and 84b through which bolts 68 are inserted. To attach front panel 16 to main box 12, holes 70 and 84 are aligned with trim openings 72a and 72b (defined in trim panels 43a and 43b) so that bolts 68 can be inserted. Nuts 74a (FIG. 4) and 74b (not shown) are fastened at the ends of bolts 68. It may be appreciated that a variety of fasteners may be used to pivotally attach front panel 16 to main box 12, but applicants have found use of bolts 68 to operate most effectively.

Stumps 82 allow front panel 16 to be more securely attached to main box 12. Rather than simply attach panel 16 to the singular points at trim panels 43, stumps 82 provide an increased contact area and allow for multiple points of contact between front panel 16 and main box 12. Bolts 68 extend through stumps 82 so that front panel 16 may rotate about a longer pivot. Providing a longer pivot provides added strength to the attachment. It may be appreciated that multiple stumps may be used, as well as a single bolt running from side to side of main box 12.

Figure 8:
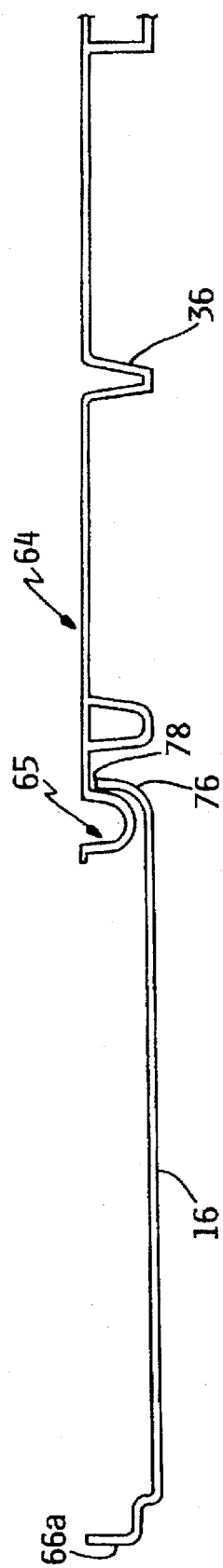
FIG. 8 is a cross sectional view illustrating the front panel in opened position where it stabilizes at a substantially horizontal position.
Figure 10:
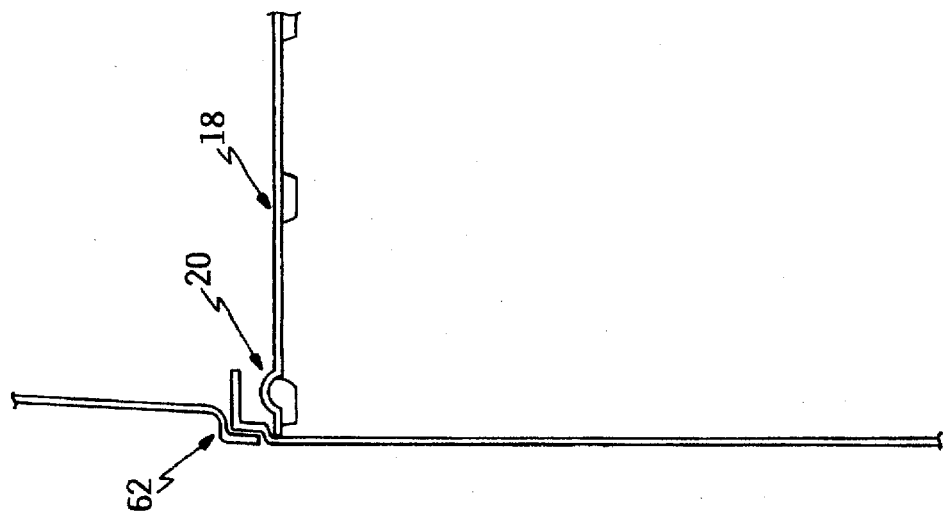
FIG. 10 is a cross-sectional view illustrating the sink interlocking the front panel taken along lines 7—7 of FIG. 1.

Stop panel 76 is integrally connected to front panel 16 and is rounded so as to mate with box bottom 64 as shown in FIGS. 4, 7 and 8. Box bottom 64 has rounded trough 65 about which stop panel 76 rotates. Rotation of stop panel 76 occurs along the underside of trough 65, away from the view of a user or camper. Stop panel 76 has edge 78 which abuts with the bottom of box bottom 64 so that front panel 16 is stopped or suspended in a relatively horizontal position, as shown in FIGS. 2, 3 and 8. In such a position, front panel 16 may be used as a work station upon which food products or equipment may be prepared or displayed. It may be appreciated that stop panel 76 need not extend the length of main box 12 in order to hold front panel 16 in a relatively horizontal position. While stop panel 76 may contact box bottom 64 at only one position to hold front panel 16, applicants have found that having a substantially full length stop panel is preferred. Employing stop panel 76 and edge 78 is one means of supporting front panel 16 in a relatively horizontal position. Other means may be employed, including but not limited to use of suspension lines that attach to both front panel 16 and main box 12, use of an extension piece that extends from the bottom of main box 12 so as to cause front panel to stop in a relatively horizontal position, or use of a locking hinge mechanism to stop panel 16.

Figure 9:
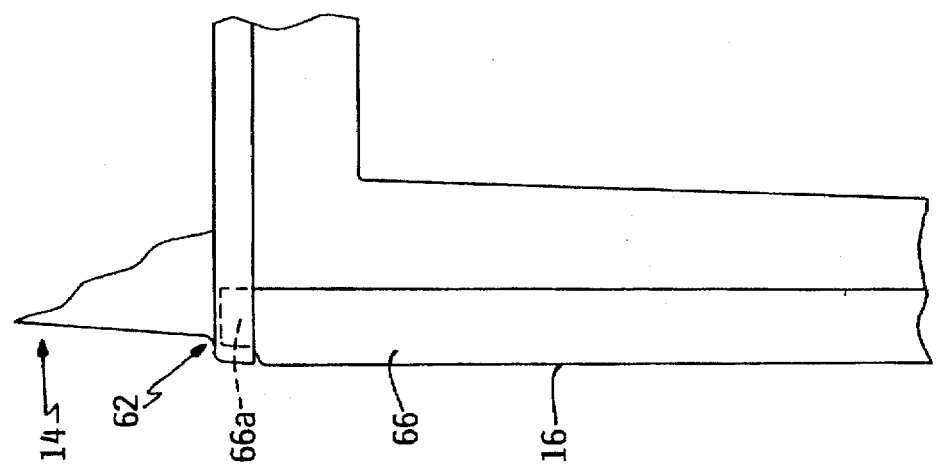
FIG. 9 is a right side view illustrating a close-up of the sink interlocking the front panel.

Front panel brim 66 is integrally attached to front panel 16 and extends about the perimeter to stop panel 76 as shown in FIG. 4. Front panel brim 66 more specifically defines holes 70a and 70b which are used for securing front panel 16 as described earlier. When front panel 16 is closed, brim 66 is aligned flush with front support legs 42. Brim segment 66a is slightly recessed as compared to brim 66 as shown in FIGS. 2 and 9. As shown in FIG. 9, having brim segment 66 recessed allows sink 14 to mate so that sink brim 62 aligns flush with front panel 16. When sink 14 is closed, sink brim 62 interlocks front panel brim 66a thereby interlocking front panel 16. More particularly, sink brim 62 overlocks panel 16. FIG. 6 shows kitchen 10 with front panel 16 closed and sink 14 closed and interlocking front panel 16. FIG. 7 is a cross section view further illustrating the interlocking feature of the present invention. This allows the user to transport the kitchen 10 having both sink 14 and front panel 16 secure. By securing sink 14 and front panel 16, a user can confidently carry kitchen 10 without worry that the contents will fall out.

Friction knobs 80a and 80b are integrally connected to trim panels 43 and extend to abut front panel brim 66 to create a securing friction so that front panel 16 does not freely swing open if sink 14 is not interlocking. It can be appreciated that a variety of locking or friction mechanisms may be used to provide further locking protection.

FIG. 3 illustrates kitchen 10 having sink 14 open and attached, and having front panel 16 opened in its horizontal position. In this position kitchen 10 is fully functional to support a common two-burner stove and other items on table 18, to hold liquids or items such as buns, bread, or refuse in sink 14, to place food products, plates, or condiments on front panel 16, and to conveniently grasp items stored in the various compartments 54 and 56. Items placed within main box 12 and upon front panel 16 counterbalance items placed in sink 14 so that kitchen 10 is stable.

FIG. 11 shows sink 14 detached and used as a stand upon which main box 12 is placed. In this position, front panel 16 may be either closed, or open to a horizontal position as shown in FIG. 13. FIG. 12 shows sink 14 used as a stand. In this configuration table 18 is elevated from ground level to provide the camper with convenient use. It also allows front panel 16 to be operated without interference from the ground.

It is presently contemplated that portable kitchen 10, and sink 14, main box 12 and front panel 16 can be made of suitable molding plastics such as polyethylene, polypropylene, polyvinylchloride, etc. The plastics used may exhibit thermoplastic features for controlling temperature within kitchen 10. A variety of manufacturing techniques can be used to form the portable kitchen 10 and its various parts, including rotation molding, injection molding, blow molding, etc. At present, applicants create the product in a rotational molding process using high density polyethylene. Additional resins or ingredients may be included to provide various levels of rigidity and various textures and properties.

Portable kitchen 10 may incorporate a variety of the aforesaid features. Further embodiments combine several of those features simultaneously. One such embodiment includes main box 12 having table 18, sink 14 detachably connected to main box 12, and front panel 16 pivotally attached to main box 12 so that front panel 16 opens to provide access to compartments 54. Sink 14 can be detachably and hingedly connected. In other words, sink 14 can open and close and be positioned in a variety of locations therebetween; sink 14 can then be disconnected for further operation as previously described. Having these multipurpose features provides a camper with a highly functional product. Kitchen 10 can be manufactured from plastic and mass produced, thereby resulting in an inexpensive quality product having a strong advantage in the marketplace.

Yet another embodiment of the present invention is for sink 14 to be only hingedly connected. This obviates for need to make the product detachable, which is a feature that some consumers may prefer. The product can nonetheless be used for all the mentioned purposes other than those involving detachment of sink 14.

Another embodiment of the present invention involves a system for storing and preparing food products employing the steps of providing the structural aspects of the prior mentioned embodiments. In this embodiment the system is provided with main box 12 having table 18, sink 14 defining recess area 46, and front panel 16. Sink 14 is detachably connected to main box 12, and front panel 16 is rotatably connected to main box 12. The system allows a camper to place food products in main box 12 while preparing foods on table 18 and front panel 16. It may be appreciated that sink 14 may also be detachably and hingedly connected to main box 12.

While particular embodiments of the portable kitchen have been shown, it will be appreciated by those skilled in the art that modifications may be made without departing from the invention in its broader aspects and as set forth in the following claims.

We claim:

1. A portable kitchen for storing and preparing food products, said kitchen comprising:

a main box having a box bottom, side portions, a box rear, and a stabilizing beam integrally connected to said box bottom; and a sink having a sink front panel, a sink rear panel, sink side panels, and a continuous sink top, said sink detachably connected to said main box.

2. A portable kitchen for storing and preparing food products, said kitchen comprising:

a main box having a box bottom, side portions, a box rear, and an exposed front panel that opens to provide access to a compartment defined by said main box, said front panel having an edge which abuts said main box to support said front panel in a relatively horizontal position; and a sink having a sink rear panel, sink side panels, and a continuous sink top, said sink detachably connected to said main box.

3. A portable kitchen according to claim 2 wherein said edge abuts said main box at a box bottom.

* * * * *